United States Patent
Imamura et al.

(10) Patent No.: US 9,480,019 B2
(45) Date of Patent: Oct. 25, 2016

(54) WIRELESS COMMUNICATION APPARATUS AND WIRELESS COMMUNICATION METHOD

(71) Applicant: Panasonic Corporation, Osaka (JP)

(72) Inventors: Koji Imamura, Shiga (JP); Takayuki Abe, Tokyo (JP)

(73) Assignee: Panasonic Corporation, Osaka (JP)

(*) Notice: Subject to any disclaimer, the term of this patent is extended or adjusted under 35 U.S.C. 154(b) by 45 days.

(21) Appl. No.: 14/400,781

(22) PCT Filed: Mar. 12, 2014

(86) PCT No.: PCT/JP2014/001414
§ 371 (c)(1),
(2) Date: Nov. 12, 2014

(87) PCT Pub. No.: WO2014/141706
PCT Pub. Date: Sep. 18, 2014

(65) Prior Publication Data
US 2015/0245293 A1 Aug. 27, 2015

(30) Foreign Application Priority Data
Mar. 14, 2013 (JP) .................. 2013-052223

(51) Int. Cl.
*H04W 52/02* (2009.01)
*H04B 1/04* (2006.01)

(52) U.S. Cl.
CPC .. *H04W 52/0229* (2013.01); *H04B 2001/0416* (2013.01); *Y02B 60/50* (2013.01)

(58) Field of Classification Search
None
See application file for complete search history.

(56) References Cited

U.S. PATENT DOCUMENTS

2006/0270381 A1* 11/2006 Park .................. H04B 1/1615
455/343.2

FOREIGN PATENT DOCUMENTS

| JP | 2000-124753 A | 4/2000 |
|----|---------------|--------|
| JP | 2006-049972 A | 2/2006 |

OTHER PUBLICATIONS

International Search Report, mailed Jun. 17, 2014, for International Application No. PCT/JP2014/001414, 2 pages.

* cited by examiner

*Primary Examiner* — Jason Mattis
*Assistant Examiner* — Teisha D Hall
(74) *Attorney, Agent, or Firm* — Seed IP Law Group LLP (57) ABSTRACT

A wireless communication apparatus in a first wireless communication system is equipped with a power detector for detecting power of a reception signal; an envelope detector for detecting an envelope signal of the reception signal; a signal determiner for determining whether the reception signal is a first signal to be used for a communication in the first wireless communication system, on the basis of a variation amount of the envelope signal; a wireless communicator for performing a wireless communication; and a wireless communication activator for activating the wireless communicator when the wireless communication apparatus detects power of the reception signal and determines that the reception signal is the first signal.

10 Claims, 5 Drawing Sheets

WIRELESS COMMUNICATION APPARATUS AND WIRELESS COMMUNICATION METHOD

TECHNICAL FIELD

The present invention relates to a wireless communication apparatus and a wireless communication method.

BACKGROUND ART

Conventionally, various methods for reducing the power consumption of wireless terminals have been proposed. For example, wake-up type wireless apparatus are known which are equipped with a wireless communicator for transmitting and receiving data signals and a reception unit which is dedicated to reception.

In a reception standby period, wake-up type wireless apparatus operate in a low-power-consumption sleep mode or the like in which the wireless communicator is supplied with no power in a reception standby state or no reception standby operation is performed. Supply of power to the wireless communicator is started after the reception unit which is dedicated to reception detects a wake-up signal that is transmitted from a transmission side before a start of transmission and reception of data signals.

Among conventional wake-up type wireless apparatus are wireless receivers which are equipped with a wireless communicator and an envelope detector and in which pattern detection is started according to presence/absence of power in a prescribed band and the wireless communicator is activated upon detection of a pattern (refer to Patent document 1, for example).

PRIOR ART DOCUMENTS

Patent Documents

Patent document 1: US-A-2006/0270381

SUMMARY OF THE INVENTION

Problems to Be Solved by the Invention

In the wireless receiver disclosed in Patent document 1, the operation ratio of the wireless communicator cannot be made sufficiently low and hence the power consumption in a reception standby period may become high.

The present disclosure has been made in the above circumstances, and is therefore intended to provide a wireless communication apparatus and a wireless communication method which can reduce the power consumption in a reception standby period.

Means for Solving the Problems

A wireless communication apparatus according to the disclosure is an wireless communication apparatus in a first wireless communication system, including a power detector that detects power of a reception signal; an envelope detection unit that detects an envelope of the reception signal; a signal determiner that determines whether the reception signal is a first signal to be used for a communication in the first wireless communication system, on the basis of a variation amount of an envelope signal generated through the detection by the envelope detection unit; a wireless communicator that performs a wireless communication; and a wireless communication activator that activates the wireless communicator when the power detector detects power of the reception signal and the signal determiner determines that the reception signal is the first signal.

Advantages of the Invention

The disclosure makes it possible to reduce the power consumption in a reception standby period.

MODES FOR CARRYING OUT THE INVENTION

Embodiments of the present disclosure will be hereinafter described with reference to the drawings.
(Background of One Aspect of the Disclosure)

In the wireless receiver disclosed in Patent document 1, no consideration is given to whether detected power is of a wireless signal directed to the self terminal or of a wireless signal directed to another terminal. Therefore, the wireless communicator is activated also when signal power of a wireless signal directed to a terminal other than the self terminal is detected, resulting in increase in the operation ratio of the wireless communicator and power consumption.

A description will be made below of a wireless communication apparatus and a wireless communication method which can reduce the power consumption in a reception standby period.

In the embodiments described below, a wireless system including small, low-power-consumption wireless communication apparatus is formed. The wireless system may be a WPAN (wireless personal area network) or a sensor wireless network system, for example.

In the wireless system, communications are performed using, for example, millimeter waves or microwaves. The wireless communication apparatus used in the wireless system are small, can operate on a battery for several years, and exhibit lower power consumption performance. For example, the wireless communication apparatus can be used for communications that are low in transmission rate (about several kilobits per second to several hundreds of kilobits per second) and short in signal transmission distance (about several meters to several tens of meters).

It is assumed that plural wireless systems are exist and various wireless systems share the same radio frequency channel and different modulated signals are transmitted in mixture.

Embodiment 1

Figure 1:
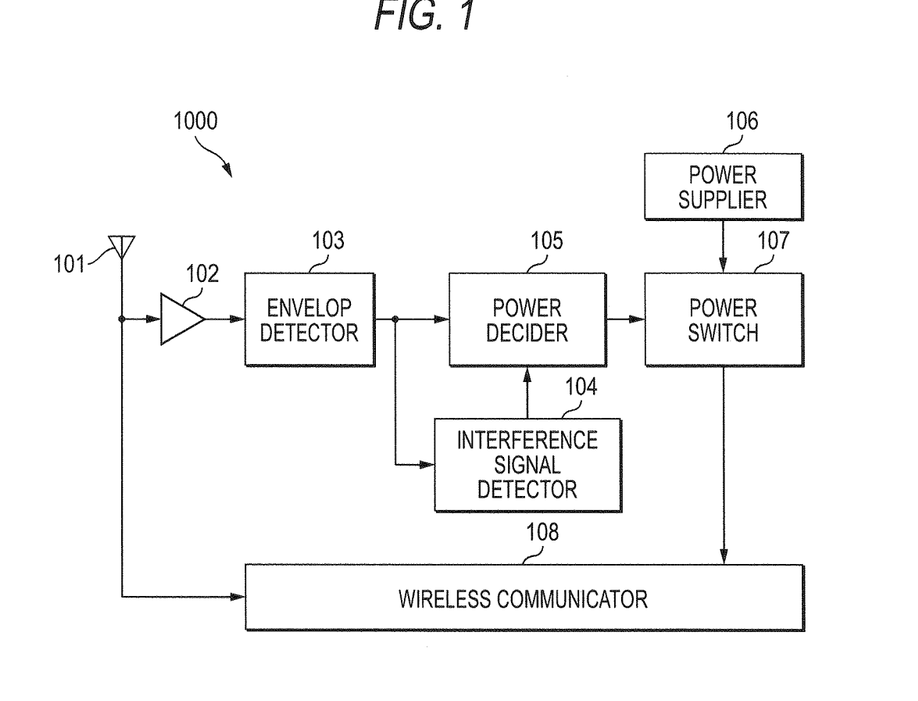
FIG. 1 is a block diagram showing an example configuration of a wireless communication apparatus according to a first embodiment of the present disclosure.

FIG. 1 is a block diagram showing an example configuration of a wireless communication apparatus 1000 according to a first embodiment. The wireless communication apparatus 1000 is equipped with an antenna 101, an LNA (low-noise amplifier) 102, an envelope detector 103, an interference signal detector 104, a power decider 105, a power supplier 106, a power switch 107, and a wireless communicator 108.

This embodiment is mainly directed to an example case that a non-constant envelope signal is used for communications in a wireless system to which the wireless communication apparatus 1000 belongs (also called a wireless system of the self terminal). The non-constant envelope signal may be, for example, a signal that is modulated according to OFDM (orthogonal frequency division multiplexing). In this example case, a constant envelope signal is used for communications in the other wireless systems. The constant envelope signal may be, for example, a signal that is modulated according to FSK (frequency shift keying).

In a reception standby period, the antenna 101 receives a wake-up signal or a data signal and outputs the reception signal to the LNA 102 and the wireless communicator 108. For example, the generation source of the reception signal may be another wireless communication apparatus (communication partner) belonging to the wireless system of the self terminal (an example of a first wireless communication system) or a wireless communication apparatus (communication partner) belonging to another wireless system (an example of a second wireless communication system).

For example, the reception waiting period is a period to a time when power of a signal to be used for a communication in the wireless system of the self terminal is detected by the power decider 105 and the wireless communicator 108 is activated.

The LNA 102 receives the reception signal from the antenna 101. The LNA 102 amplifies the reception signal at a prescribed gain and outputs the amplified reception signal to the envelope detector 103.

The envelope detector 103 receives the reception signal as amplified by the LNA 102. The envelope detector 103 extracts envelope information from the amplified reception signal, and outputs an envelope signal including the envelope information to the interference signal detector 104 and the power decider 105.

The interference signal detector 104 receives the envelope signal from the envelope detector 103. The interference signal detector 104 calculates an envelope variation amount from the envelope signal, and determines, on the basis of the envelope variation amount, whether or not the reception signal is a signal (interference signal, an example of a second signal) that has come from a wireless communication apparatus belonging to another wireless system. In other words, the interference signal detector 104 determines, on the basis of the envelope variation amount, whether or not the reception signal is a signal (an example of a first signal) to be used in the wireless system of the self terminal. The interference signal detector 104 outputs an interference determinant signal including a result of the above determinant to the power decider 105. The interference signal detector 104 is an example of a signal determiner.

Since a signal to be used in the wireless system of the self terminal is a non-constant envelope signal, a value indicating that the reception signal is not an interference signal is output as an interference determinant signal when the envelope variation amount is large. For example, "H (high)" is used as a value indicating that the reception signal is an interference signal and "L (low)" is used as a value indicating that the reception signal is not an interference signal. In the above example, "L" is output as an interference determinant signal.

Since a signal coming from another wireless system is a constant envelope signal, a value indicating that the reception signal is an interference signal is output as an interference determinant signal when the envelope variation amount is small. For example, "H" is output as an interference determinant signal. "H" and "L" may be given opposite meanings to the ones described above.

The power decider 105 receives the envelope signal and the interference determinant signal from the envelope detector 103 and the interference signal detector 104, respectively. The power decider 105 determines, on the basis of the envelope signal and the interference determinant signal, whether power of a reception signal coming from another wireless communication apparatus belonging to the wireless system of the self terminal exists or not. For example, when power of a reception signal coming from another wireless communication apparatus belonging to the wireless system of the self terminal exists, the power decider 105 outputs a first power control signal to the power switch 107. The power decider 105 is an example of a power detector.

The power supplier 106 supplies power to the individual blocks. The supply of power to the wireless communicator 108 is controlled by the power switch 107.

The power switch 107 receives the first power control signal from the power decider 105, and controls the supply of power to the wireless communicator 108 according to the first power control signal. As such, the power switch 107 is an example of a wireless communication activator.

For example, when receiving a first power control signal, the power switch 107 renders itself in an on state and thereby allows supply of power from the power supplier 106 to the wireless communicator 108. On the other hand, for example, when not receiving a first power control signal, the power switch 107 renders itself in an off state and thereby prohibits supply of power from the power supplier 106 to the wireless communicator 108.

When the power switch 107 is turned on, the wireless communicator 108 is supplied with power from the power supplier 106 and starts operating.

The wireless communicator 108 consumes more power than the other constituent blocks because it includes a frequency conversion unit and a demodulator, for example, and processes a reception signal bit by bit. The wireless communicator 108 is an example of a wireless communicator for performing a wireless communication.

The first power control signal may have a value "H" or "L." For example, the power switch 107 may start supplying power when the first power control signal becomes "H" or "L" rather than when it receives a first power control signal.

The wireless communication apparatus 1000 can reduce its power consumption in a reception standby period by shortening the operation time of the wireless communicator 108 which is high in power consumption.

Next, the interference signal detector 104 and the power decider 105 will be described in detail.

Figure 2:
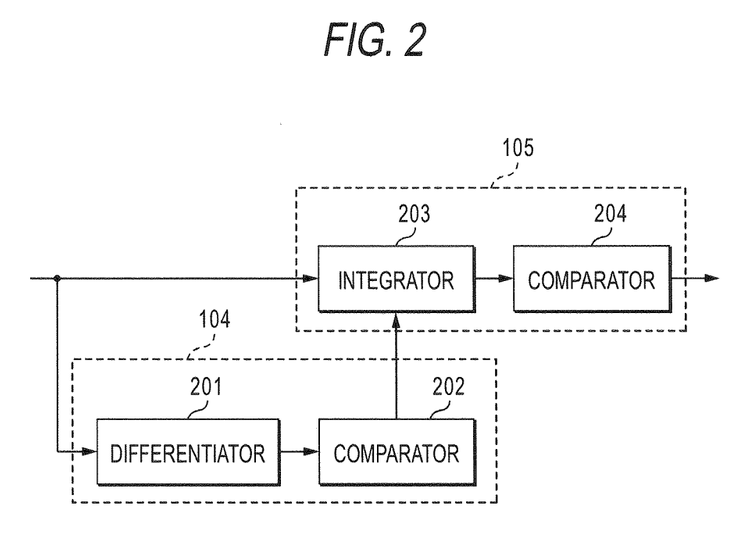
FIG. 2 is a block diagram showing first example configurations of an interference signal detector and a power decider.

FIG. 2 is a block diagram showing first example configurations of the interference signal detector 104 and the power decider 105. The interference signal detector 104 includes a differentiator 201 and a comparator 202. The power decider 105 includes an integrator 203 and a comparator 204.

The differentiator 201 receives an envelope signal from the upstream envelope detector 103, and extracts a time variation component from the envelope signal by differentiating it. The differentiator 201 outputs a time variation component signal including the time variation component of the envelope signal to the comparator 202. For example, the differentiation operation of the differentiator 201 is implemented as an HPF (highpass filter).

The comparator 202 receives the time variation component signal from the differentiator 201 and compares the time variation component signal with a preset first threshold value. The comparator 202 outputs a time variation component comparison signal including a result of the comparison to the integrator 203.

For example, when the time variation component comparison signal is smaller than the first threshold value, the comparator 202 can judge that the envelope variation is small. In this case, the reception signal can be estimated to be an interference signal and hence the comparator 202 outputs a time variation component comparison signal that serves to suspend operation of the integrator 203. For example, "H (high)" is used as a value to the effect that the integration operation of the integrator 203 should be suspended and "L (low)" is used as a value to the effect that the integrator 203 should operate. In the above example, "H" is output as a time variation component comparison signal.

The comparator 202 may perform a comparison operation instantaneously (i.e., in a prescribed short time) and update the time variation component comparison signal every time it performs a comparison operation. Alternatively, the comparator 202 may determine whether to output an "H" or "L" time variation component comparison signal by measuring the number of times the time variation component signal falls short of the first threshold value. For example, the comparator 202 may output "H" as a time variation component comparison signal when the measured number of times is larger than or equal to a prescribed number. "H" and "L" may be given opposite meanings to the ones described above.

The integrator 203 receives the envelope signal from the upstream envelope detector 103 and receives the time variation component comparison signal from the comparator 202. The integrator 203 calculates an average reception signal power by integrating the envelope signal, and outputs average reception signal power information including a result of the calculation to the comparator 204. In doing so, the integrator 203 changes the integration interval in accordance with the time variation component comparison signal.

For example, the integrator 203 performs integration while the time variation component comparison signal is "L" and suspends integration while the time variation component comparison signal is "H." This makes it possible to exclude signals to be used in other wireless systems and detect power of a signal to be used in the wireless system of the self terminal. For example, the integration operation of the integrator 203 is implemented as an LPF (lowpass filter).

The comparator 204 receives the average reception signal power information from the integrator 203 and compares the average reception signal power information with a preset second threshold value. The comparator 204 outputs a first power control signal including a result of the comparison. For example, a first power control signal indicating that the reception signal has come from another wireless communication apparatus belonging to the wireless system of the self terminal is output when the average reception signal power is higher than or equal to a second threshold value. A first power control signal indicating that the reception signal is not one that has come from another wireless communication apparatus belonging to the wireless system of the self terminal is output when the average reception signal power is lower than the second threshold value.

For example, the first example configurations of the interference signal detector 104 and the power decider 105 make it possible to exclude interference signals (including noises) and detect power of a reception signal to be used in the wireless system of the self terminal. They also make it possible to increase the accuracy of detecting whether a reception signal is one to be used in wireless system of the self terminal or an interference signal.

Figure 3:
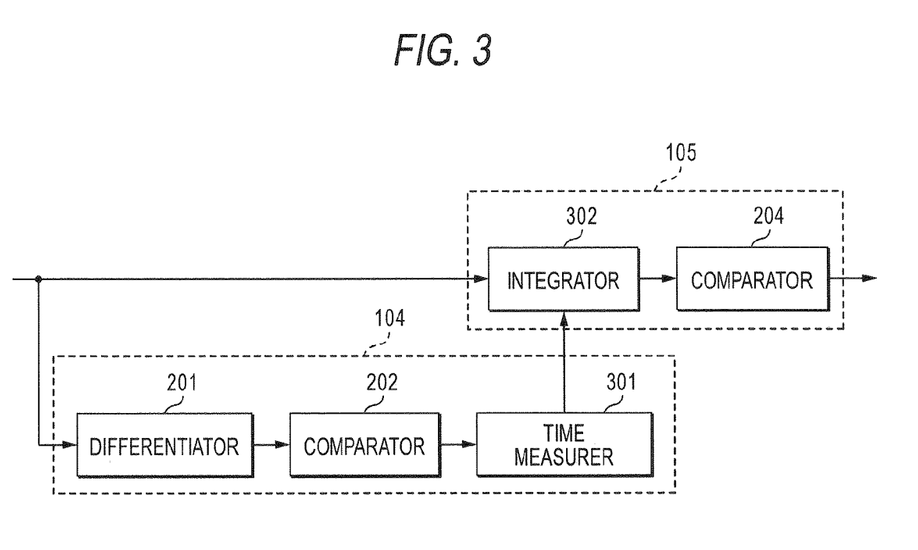
FIG. 3 is a block diagram showing second example configurations of the interference signal detector and the power decider.

FIG. 3 is a block diagram showing second example configurations of the interference signal detector 104 and the power decider 105. The interference signal detector 104 includes a differentiator 201, a comparator 202, and a time measurer 301. The power decider 105 includes an integrator 302 and a comparator 204.

The differentiator 201 and the comparator 202, 204 operate in the same manners as in the first example configuration and hence descriptions therefor will be omitted.

The time measurer 301 receives a time variation component comparison signal from the comparator 202. When the time variation component comparison signal indicates that the envelope variation is small, for example, when the time variation component comparison signal is "H," the time measurer 301 outputs, to the integrator 302, an integration operation control signal for suspending operation of the integrator 302 for a prescribed time. For example, the prescribed time for which to suspend operation of the integrator 302 is set equal to one symbol interval of a data signal. For example, the time measurer 301 outputs an integration operation control signal "H" in suspending operation of the integrator 302 for the prescribed time.

When the time variation component comparison signal indicates that the envelope variation is large, for example, the time variation component comparison signal is "L," the time measurer 301 outputs, to the integrator 302, an integration operation control signal for permitting operation of the integrator 302. For example, the time measurer 301 outputs an integration operation control signal "L" in permitting operation of the integrator 302. "H" and "L" may be given opposite meanings to the ones described above.

The integrator 302 receives an envelope signal from the envelope detector 103 and receives the integration operation control signal from the time measurer 301. The integrator 302 calculates an average reception signal power by integrating the envelope signal, and outputs average reception signal power information including a result of the calculation to the comparator 204. In doing so, the integrator 302 changes the integration interval in accordance with the integration operation control signal.

For example, the integrator 302 performs integration while the integration operation control signal is "L" and suspends integration while the integration operation control signal is "H." For example, the integration operation of the integrator 302 is implemented as an LPF (lowpass filter).

For example, when an OFDM modulated signal is received, the envelope variation amount is large and the amplitude of the envelope crosses the threshold value frequently in the comparator 202. Therefore, in the interference signal determinant, determinant results to the effect that the reception signal is an interference signal and determinant results to the effect that the reception signal is not an interference signal occur in mixture.

For example, the second example configurations of the interference signal detector 104 and the power decider 105 make it possible to increase the accuracy of detection of an interference signal in the case where the wireless system of the self terminal employs an FSK modulated signal and the other wireless systems employ an OFDM modulated signal.

For example, even though a reception signal is once determined an FSK modulated signal (in the embodiment, an non-interference signal), power integration can be suspended for a prescribed time taking into consideration a probability that the reception signal is actually an OFDM signal (interference signal). Thus, accuracy of detection of an interference signal can be increased.

Figure 4:
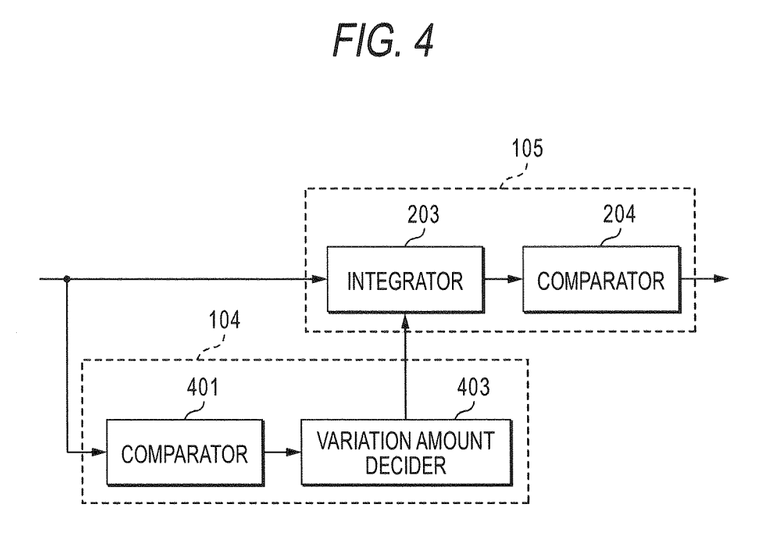
FIG. 4 is a block diagram showing third example configurations of the interference signal detector and the power decider.

FIG. 4 is a block diagram showing third example configurations of the interference signal detector 104 and the power decider 105. The interference signal detector 104 includes a comparator 401 and a variation amount decider 403. The power decider 105 includes an integrator 203 and a comparator 204.

The comparator 401 receives an envelope signal from the upstream envelope detector 103. The comparator 401 compares the envelope signal with a preset third threshold value (an example of a first prescribed value) and a preset fourth threshold value (an example of a second prescribed value) and thereby determines whether or not the amplitude of the envelope signal lies between the third threshold value and the fourth threshold value. The comparator 401 outputs a comparison signal including a result of the determinant to the variation amount decider 403.

The variation amount decider 403 receives the comparison signal from the comparator 401. The variation amount decider 403 outputs, to the integrator 203, an integration operation control signal (e.g., "H") for suspending operation of the integrator 302 when the number of times the envelope signal crosses at least one of the third threshold value and the fourth threshold value is smaller than a prescribed number, that is, the variation amount of the amplitude of the envelope is small.

The variation amount decider 403 outputs, to the integrator 203, an integration operation control signal (e.g., "L") for permitting operation of the integrator 302 when the number of times the envelope signal crosses at least one of the third threshold value and the fourth threshold value is larger than or equal to the prescribed number, that is, the variation amount of the amplitude of the envelope is large. "H" and "L" may be given opposite meanings to the ones described above.

The third example configurations of the interference signal detector 104 and the power decider 105 make it possible to increase the accuracy of detection of an interference signal. Furthermore, they make it possible to judge whether a reception signal is an interference signal without using a differentiator and to thereby simplify the configuration of the interference signal detector 104.

Like that having the second example configuration, the interference signal detector 104 having the third example configuration may be given the same function as the time measurer 301 to suspend operation of the integrator 203 for a prescribed time.

As described above, the wireless communication apparatus 1000 determines signal presence/absence by detecting power of a reception signal and then determines whether the reception signal is a modulated signal to be communicated in the wireless system of the self terminal or an interference signal. Based on a result of this determinant, the wireless communication apparatus 1000 reacts to power of the modulated signal to be used in the wireless system of the self terminal and activates the wireless communicator 108.

According to the wireless communication apparatus 1000, erroneous activation of the wireless communicator 108 by power of a modulated signal to be used in another wireless system can be suppressed and the power consumption in a reception standby period can be reduced. The communication delay can be made shorter than in a case of intermitted reception which is restricted in communication timing. Furthermore, for example, a sensor wireless network system including the wireless communication apparatus 1000 can be reduced in power consumption.

Although in the above embodiment the antenna 101 outputs a reception signal to the LNA 102 and the wireless communicator 108, a radio-frequency switch may be disposed between the antenna 101 and the combination of the LNA 102 and the wireless communicator 108. The radio-frequency switch may be switched in link with a control signal for the power switch 107.

It is also possible to use a constant envelope signal for communications in the wireless system of the self terminal and use a non-constant envelope signal for communications in the other communication systems.

When the wireless communicator 108 is activated, the supply of power to the LNA 102, the envelope detector 103, the interference signal detector 104, and the power decider 105 may be suspended. This enables reduction of the power consumption also during operation of the wireless communicator 108.

An output of the envelope detector 103 may be quantized using an analog-to-digital converter (ADC), for example. In this case, for example, the wireless communication apparatus 1000 may detect an interference signal or judge power of a reception signal through digital processing.

Embodiment 2

Figure 5:
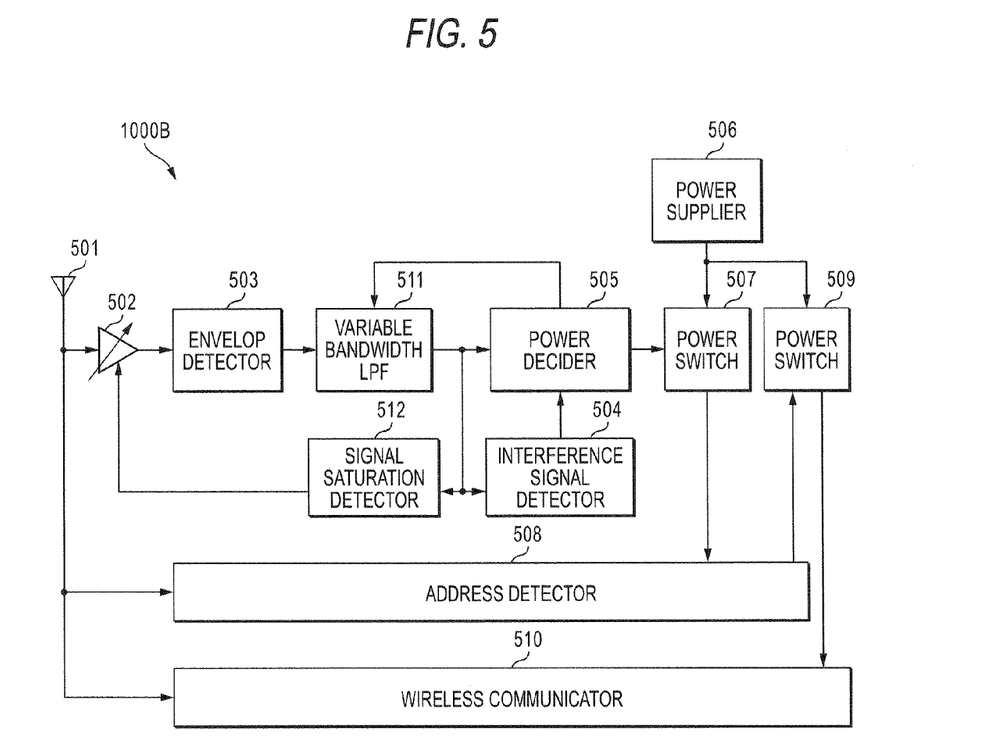
FIG. 5 is a block diagram showing an example configuration of a wireless communication apparatus according to a second embodiment of the disclosure.

FIG. 5 is a block diagram showing an example configuration of a wireless communication apparatus 1000B according to a second embodiment. The wireless communication apparatus 1000B is equipped with an antenna 501, a variable gain LNA 502, an envelope detector 503, a variable bandwidth LPF 511, a signal saturation detection unit 512, an interference signal detector 504, and a power decider 505. The wireless communication apparatus 1000B is also equipped with a power supplier 506, a power switch 507, an Address detector 508, a power switch 509, and a wireless communicator 510.

This embodiment is mainly directed to an example case that a constant envelope signal (e.g., FSK modulated signal) is used for communications in a wireless system to which the self terminal and a non-constant envelope signal (e.g., OFDM modulated signal) is used for communications in the other wireless systems.

The antenna 501 receives a wake-up signal or a data signal and outputs the reception signal to the variable LNA 502, the Address detector 508, and the wireless communicator 510.

The variable gain LNA 502 receives the reception signal from the antenna 501 and receives a gain control signal from the signal saturation detection unit 512. The gain control signal is a signal for control the gain of the variable gain LNA 502. The variable gain LNA 502 amplifies the reception signal at a gain corresponding to the gain control signal and outputs the amplified reception signal to the envelope detector 503. The variable gain LNA 502 is an example of a signal amplifier.

The envelope detector 503 receives the reception signal as amplified by the LNA 102. The envelope detector 503 extracts envelope information from the amplified reception signal, and outputs an envelope signal including the envelope information to the variable bandwidth LPF 511.

The variable bandwidth LPF 511 receives the envelope signal from the envelope detector 503 and receives a bandwidth control signal from the power decider 505. The variable bandwidth LPF 511 restricts the bandwidth of the envelope signal to a signal band corresponding to the bandwidth control signal. The variable bandwidth LPF 511 outputs the bandwidth-restricted envelope signal to the signal saturation detection unit 512, the interference signal detector 504, and the power decider 505. The variable bandwidth LPF 511 is an example of a frequency bandwidth limiter.

As the degree of the bandwidth restriction by the variable bandwidth LPF 511 is made lower, that is, as the pass band of an envelope signal is made wider, an envelope variation is maintained to a larger extent and the interference signal determinant using an envelope variation is made easier. On the other hand, as the degree of the bandwidth restriction by the LPF 511 is made higher, that is, as the pass band of an envelope signal is made narrower, the envelope signal waveform varies more gently and the signal power is made more stable.

In view of the above, the variable bandwidth LPF 511 sets the frequency pass band to a wide band until the power decider 505 determines whether the reception signal is an interference signal or not and, after the determinant is made, sets the frequency pass band to a narrow band by increasing the degree of the bandwidth restriction.

With the above measure, an envelope variation can be detected easily during an interference signal determinant, whereby the accuracy of detection of an interference signal can be increased. After interference signal determinant becomes no longer necessary, the accuracy of detection of power of a modulated signal to be used in the wireless system of the self terminal can be increased.

The signal saturation detection unit 512 receives the bandwidth-restricted envelope signal from the variable bandwidth LPF 511. The signal saturation detection unit 512 determines whether the reception signal is saturated or not on the basis of whether a state that the amplified envelope signal is larger than a fifth threshold value which is close to an upper limit output value of the variable bandwidth LPF 511 has lasted a prescribed time or more. For example, the saturation of a reception signal means a state that an envelope signal has been amplified excessively and the accuracy of detection of an envelope signal variation amount is thereby lowered.

When the reception signal is saturated, the signal saturation detection unit 512 outputs a gain control signal for setting the gain of the variable gain LNA 502 low to the variable gain LNA 502. The signal saturation detection unit 512 is an example of a gain controller.

With this measure, excessive amplification of an envelope signal can be avoided and the accuracy of detection of an envelope signal variation amount can thereby be increased. As a result, the accuracy of detection of an interference signal by the interference signal detector 504 and the accuracy of power detection by the power decider 505 can be increased.

The interference signal detector 504 receives the bandwidth-restricted envelope signal from the variable bandwidth LPF 511. The interference signal detector 504 calculates an envelope variation amount from the envelope signal, and determines, on the basis of the envelope variation amount, whether or not the reception signal is an interference signal. The interference signal detector 504 outputs an interference determinant signal including a result of the above determinant to the power decider 505. The interference signal detector 504 is configured in the same manner as the interference signal detector 104 shown in any of FIGS. 2-4.

Since a signal to be used in the wireless system of the self terminal is a constant envelope signal, a value indicating that the reception signal is not an interference signal is output as an interference determinant signal when the envelope variation amount is small. For example, "H (high)" is used as a value indicating that the reception signal is an interference signal and "L (low)" is used as a value indicating that the reception signal is not an interference signal. In the above example, "L" is output as an interference determinant signal.

Since a signal coming from another wireless system is a non-constant envelope signal, a value indicating that the reception signal is an interference signal is output as an interference determinant signal when the envelope variation amount is large. For example, "H" is output as an interference determinant signal. "H" and "L" may be given opposite meanings to the ones described above.

The power decider 505 receives the bandwidth-restricted envelope signal and the interference determinant signal from the variable bandwidth LPF 511 and the interference signal detector 504, respectively. The power decider 505 determines, on the basis of the envelope signal and the interference determinant signal, whether power of a reception signal coming from another wireless communication apparatus belonging to the wireless system of the self terminal exists or not. The power decider 505 is configured in the same manner as the power decider 105 shown in any of FIGS. 2-4.

When power of a reception signal coming from another wireless communication apparatus belonging to the wireless system of the self terminal exists, the power decider 505 outputs, to the variable bandwidth LPF 511, a bandwidth control signal for increasing the degree of bandwidth restriction by the variable bandwidth LPF 511. Furthermore, for example, when power of a reception signal coming from another wireless communication apparatus belonging to the wireless system of the self terminal exists, the power decider 505 outputs a second power control signal to the power switch 507.

The power supplier 506 supplies power to the individual blocks. The supply of power to the address detector 508 is controlled by the power switch 507. The supply of power to the wireless communicator 510 is controlled by the power switch 509.

The power switch 507 receives the second power control signal from the power decider 505, and controls the supply of power to the Address detector 508 in accordance with the second power control signal. The power switch 507 is an example of an address determinant activator for activating an address determiner.

For example, when receiving a second power control signal, the power switch 507 renders itself in an on state and thereby allows supply of power from the power supplier 506 to the wireless communicator 510. On the other hand, for example, when not receiving a second power control signal, the power switch 507 renders itself in an off state to prohibit supply of power from the power supplier 506 to the Address detector 508.

When the power switch 507 is turned on, the Address detector 508 is supplied power from the power supplier 506 and starts operating.

Upon a start of its operation, the Address detector 508 receives the reception signal from the antenna 501 and determines address information contained in the reception signal. For example, the address information is a pattern signal that is assigned uniquely to each wireless communication apparatus, and includes an IP (Internet Protocol) address or a MAC (media access control) address. Alternatively, the address information may be a group address that is assigned to all the wireless communication apparatus belonging to the wireless system of the self terminal, rather than to each wireless communication apparatus.

The address detector 508 outputs a third power control signal to the power switch 509, when the address information contained in the reception signal approximately coincides with address information that is assigned to the wireless communication apparatus 1000B for its identification. The address detector 508 is an example of an address determiner.

The address detector 508 includes, for example, a correlator and determines pattern coincidence of address information. Therefore, like the wireless communicator 510, the address detector 508 is higher in power consumption than the other constituent blocks. However, since the address detector 508 determines pattern coincidence in units of address information, it consumes less power than the wireless communicator 510 which processes reception signal bit by bit.

The power switch 509 receives the third power control signal from the address detector 508, and controls the supply of power to the wireless communicator 510 according to the third power control signal. For example, when receiving a third power control signal, the power switch 509 renders itself in an on state and thereby allows supply of power from the power supplier 506 to the wireless communicator 510. On the other hand, for example, when not receiving a third power control signal, the power switch 509 renders itself in an off state and thereby prohibits supply of power from the power supplier 506 to the wireless communicator 510.

When the power switch 509 is turned on, the wireless communicator 510 is supplied with power from the power supplier 506 and starts operating.

The second or third power control signal may have a value "H" or "L." For example, the power switch 507 or 509 may start supplying power when the second or third power control signal becomes "H" or "L" rather than when it receives a second or third power control signal.

In the wireless communication apparatus 1000B, when power of a signal to be used in the wireless system of the self terminal, power is supplied to the address detector 508 and the address detector 508 is activated. When the address information contained in the reception signal approximately coincides with the address information of the self terminal, power is supplied to the wireless communicator 510 and the wireless communicator 510 starts operating.

As described above, the wireless communication apparatus 1000B can reduce its power consumption in a reception standby period by shortening the operation times of the address detector 508 and the wireless communicator 510 which are high in power consumption.

As described above, in the wireless communication apparatus 1000B, saturation of a reception signal is detected and the reception signal is amplified at a proper gain, that is, a gain that is suitable for the reception signal. Thus, the accuracy of determining whether a reception signal is an interference signal or not can be increased through detection of saturation of the reception signal.

In the wireless communication apparatus 1000B, the signal detection bandwidth of the variable bandwidth LPF 511 is set wide until completion of a determinant as to whether a reception signal is an interference signal or not, and set narrow in a period after the completion of the determinant. The detection of an envelope variation amount can be made easier by setting the signal bandwidth wide. And the accuracy of measuring the signal power of a reception signal can be increased by setting the signal bandwidth narrow.

In the wireless communication apparatus 1000B, presence/absence of a signal (i.e., whether or not a reception signal is a modulated signal to be used in the wireless system of the self terminal) is determined by not only detecting power of the reception signal but also using an envelope signal variation amount. The wireless communication apparatus 1000B does not react to an interference signal; instead, it reacts to power of a signal to be used in the wireless system of the self terminal and activates the address detector 508 and the wireless communicator 510 stepwise. As a result, the probability of occurrence of erroneous detection of the address detector 508 or the wireless communicator 510 by power of a signal to be used in another wireless system can be lowered and hence the power consumption in a reception standby state can be reduced.

Although in the above embodiment the antenna 501 outputs a reception signal to the variable gain LNA 502, the address detector 508, and the wireless communicator 510, a radio-frequency switch may be disposed between the antenna 501 and the combination of the variable gain LNA 502, the address detector 508, and the wireless communicator 510. The radio-frequency switch may be switched in link with control signals for the power switches 507 and 509.

It is also possible to use a non-constant envelope signal for communications in the wireless system of the self terminal and use a constant envelope signal for communications in the other communication systems.

When the wireless communicator 508 is activated, the supply of power to the variable gain LNA 502, the envelope detector 503, the interference signal detector 504, and the power decider 505 may be suspended. This enables reduction of the power consumption also during operation of the address detector 508.

When the wireless communicator 510 is activated, the supply of power to the variable gain LNA 502, the envelope detector 503, the interference signal detector 504, and the power decider 505, and the address detector 508 may be suspended. This enables reduction of the power consumption also during operation of the wireless communicator 510.

The wireless communication apparatus 1000B may be configured in such a manner as to be equipped with neither the address detector 508 nor the power switch 507 so that the wireless communicator 510 is activated directly when power of a signal to be used in the wireless system of the self terminal is detected.

For example, the address detector 508 may be equipped with an LNA or a frequency conversion unit separately from the variable gain LNA 502.

An output of the envelope detector 503 may be quantized using an ADC, for example. In this case, for example, the wireless communication apparatus 1000B may detect an interference signal or judge power of a reception signal through digital processing.

Although the above embodiments are directed to the wireless communication apparatus which can switch between the first wireless communication scheme and the second wireless communication scheme, the number of wireless communication schemes between which switching can be made is not limited to two and may be three or more.

Although each of the above embodiments is directed to an example case that the disclosure is implemented by hardware, the disclosure can also be implemented using software in coordination with hardware.

Each of the functional blocks used in the description of each of the embodiments is typically implemented as an LSI which is an integrated circuit. The functional blocks may be implemented in one-chip form individually or all or part of them may be implemented as one chip. Although the term "LSI" is used here, other terms "IC," "system LSI," "super LSI," and "ultra LSI" may also be used depending on the integration density.

The manner of circuit integration is not limited to formation of an LSI and may be formation of a dedicated circuit or use of a general-purpose processor. For example, an FPGA (field programmable gate array) which can be programmed after implementation as an LSI or a reconfigurable processor in which connections between and settings of circuit cells provided inside an LSI can be reconfigured may also be used.

Further, when an integrated circuit technology to replace the LSI formation technology appears as a result of advancement of the semiconductor technologies or birth of another, spin-off technology, naturally the integration of the functional blocks may be attained using such a technology. One possibility is use of a biotechnology.

(Summary of One Aspect of the Disclosure)

A first wireless communication apparatus according to the disclosure is a wireless communication apparatus in a first wireless communication system, comprising:

a power detector that detects power of a reception signal;

an envelope detection unit that detects an envelope of the reception signal;

a signal determiner that determines whether the reception signal is a first signal to be used for a communication in the first wireless communication system, on the basis of a variation amount of an envelope signal generated through the detection by the envelope detection unit;

a wireless communicator that performs a wireless communication; and a wireless communication activator that activates the wireless communicator when the power detector detects power of the reception signal and the signal determiner determines that the reception signal is a first signal.

A second wireless communication apparatus according to the disclosure which is based on the first wireless communication apparatus is such that:

the signal determiner determines whether the reception signal is the first signal on the basis of whether a differential value of the envelope signal is larger than or equal to a prescribed value or smaller than the prescribed value.

A third wireless communication apparatus according to the disclosure which is based on the first wireless communication apparatus is such that:

the signal determiner determines whether the reception signal is the first signal on the basis of the number of times the envelope signal crosses at least one of a first prescribed value and a second prescribed value which is larger than the first prescribed value.

A fourth wireless communication apparatus according to the disclosure which is based on any one of the first to third wireless communication apparatus is such that:

the power detector suspends the detection of power of the detection signal when the signal determiner determines that the reception signal is a second signal to be used for a communication in a second wireless communication system.

A fifth wireless communication apparatus according to the disclosure which is based on the fourth wireless communication apparatus is such that:

when the signal determiner determines that the reception signal is a second signal, the power detector suspends the detection of power of the detection signal for a prescribed time from the determinant that the reception signal is a second signal.

A sixth wireless communication apparatus according to the disclosure which is based on any one of the first to fifth wireless communication apparatus is such that:

it further comprises a frequency bandwidth limiter that restricts a frequency bandwidth of the envelope signal to a prescribed range;

the signal determiner increases the degree of the frequency bandwidth restriction by the frequency bandwidth limiter when determining that the reception signal is the first signal; and the power detector detects power of the reception signal using an envelope signal that is a result of the frequency bandwidth restriction by the frequency bandwidth limiter.

A seventh wireless communication apparatus according to the disclosure which is based on any one of the first to sixth wireless communication apparatus is such as to further comprise:

a signal amplifier that amplifies the reception signal; and a gain controller for lowering a gain of the signal amplifier when an amplitude value of an envelope signal detected from a reception signal amplified by the amplification unit is larger than or equal to a prescribed value for a prescribed time.

An eighth wireless communication apparatus according to the disclosure which is based on any one of the first to seventh wireless communication apparatus is such as to further comprise:

an address determiner for determining whether address information contained in the reception signal approximately coincides with address information for identification of the wireless communication apparatus; and an address determinant activator for activating the address determiner when the power detector detects power of the reception signal and the signal determiner determines that the reception signal is the first signal.

A ninth wireless communication apparatus according to the disclosure which is based on the eighth wireless communication apparatus is such that:

the wireless communication activator activates the wireless communicator when the address determinant activator determines that the address information contained in the reception signal approximately coincides with the address information for identification of the wireless communication apparatus.

A 10th wireless communication apparatus according to the disclosure which is based on any one of the first to ninth wireless communication apparatus is such that:

the envelope signal detected from the first signal is one of a constant envelope signal and a non-constant envelope signal; and an envelope signal detected from a second signal to be used for a communication in a second wireless communication system is the other of the constant envelope signal and the non-constant envelope signal.

A wireless communication method according to the disclosure is a wireless communication method of a wireless communication apparatus in a first wireless communication system, comprising the steps of:

detecting power of a reception signal;

determining whether the reception signal is a first signal to be used for a communication in the first wireless communication system, on the basis of a variation amount of an envelope of the reception signal;

activating a wireless communicator that performs a wireless communication when power of the detection signal is detected and it is determined that the reception signal is a first signal.

Although the disclosure has been described in detail by referring to the particular embodiments, it is apparent to those skilled in the art that various changes and modifications are possible without departing from the spirit and scope of the disclosure.

The present application is based on Japanese Patent Application No. 2013-052223 filed on Mar. 14, 2013, the disclosure of which is incorporated herein by reference.

INDUSTRIAL APPLICABILITY

The disclosure is useful as a wireless communication apparatus, a wireless communication method, etc. which can reduce the power consumption in a reception standby period.

DESCRIPTION OF SYMBOLS 1000, 1000B: Wireless communication apparatus
101: Antenna
102: LNA
103: Envelope detector
104: Interference signal detector
105: Power decider
106: Power supplier
107: Power switch
108: Wireless communicator
201: Differentiator
202: Comparator
203: Integrator
204: Comparator
301: Time measurer
302: Integrator
401: Comparator
403: Variation amount decider
501: Antenna
502: LNA
503: Envelope detector
504: Interference signal detector
505: Power decider
506: Power supplier
507: Power switch
508: Address detector
509: Power switch
510: Wireless communicator
511: Variable bandwidth LPF
512: Signal saturation detector

The invention claimed is:

1. A wireless communication apparatus in a first wireless communication system, comprising:
a power detector that detects power of a reception signal;
an envelope detector that detects an envelope signal of the reception signal;
a signal determiner that determines whether the reception signal is a first signal to be used for the first wireless communication system or a second signal to be used for a second wireless communication system, on the basis of a variation amount of the envelope signal, wherein a first envelope signal detected from the first signal is one of a constant envelope signal and a non-constant envelope signal, and a second envelope signal detected from the second signal is the other of the constant envelope signal and the non-constant envelope signal;
a wireless communicator that performs a wireless communication; and
a wireless communication activator that activates the wireless communicator when the power detector detects power of the reception signal and the signal determiner determines that the reception signal is the first signal.

2. The wireless communication apparatus according to claim 1, wherein the signal determiner determines whether the reception signal is the first signal on the basis of whether a differential value of the envelope signal is larger than or equal to a prescribed value or smaller than the prescribed value.

3. The wireless communication apparatus according to claim 1, wherein the signal determiner determines whether the reception signal is the first signal on the basis of the number of times that the envelope signal crosses at least one of a first prescribed value and a second prescribed value which is larger than the first prescribed value.

4. The wireless communication apparatus according to claim 1, wherein the power detector suspends the detection of power of the reception signal when the signal determiner determines that the reception signal is a second signal to be used for a second wireless communication system.

5. The wireless communication apparatus according to claim 4, wherein when the signal determiner determines that the reception signal is a second signal, the power detector suspends the detection of power of the reception signal for a prescribed time from the determinant that the reception signal is a second signal.

6. The wireless communication apparatus according to claim 1, further comprising a frequency bandwidth limiter that restricts a frequency bandwidth of the envelope signal to a prescribed range,
wherein the signal determiner increases the degree of the frequency bandwidth limit by the frequency bandwidth limiter when determining that the reception signal is the first signal; and
wherein the power detector detects power of the reception signal using the frequency bandwidth limited envelope signal.

7. The wireless communication apparatus according to claim 1, further comprising:
a signal amplifier that amplifies the reception signal; and
a gain controller that lowers a gain of the signal amplifier when an amplitude value of an envelope signal detected from the amplified reception signal is larger than or equal to a prescribed value for a prescribed time.

8. The wireless communication apparatus according to claim 1, further comprising:
an address determiner that determines whether address information contained in the reception signal approximately coincides with address information for identification of the wireless communication apparatus; and
an address determinant activator that activates the address determiner when the power detector detects power of the reception signal and the signal determiner determines that the reception signal is a first signal.

9. The wireless communication apparatus according to claim 8, wherein the wireless communication activator activates the wireless communicator when the address determinant activator determines that the address information contained in the reception signal approximately coincides with the address information for identification of the wireless communication apparatus.

10. A wireless communication method of a wireless communication apparatus in a first wireless communication system, the wireless communication method comprising the steps of:

detecting power of a reception signal;

determining whether the reception signal is a first signal to be used for a communication in the first wireless communication system or a second signal to be used for a second wireless communication system, on the basis of a variation amount of an envelope signal of the reception signal, wherein a first envelope signal detected from the first signal is one of a constant envelope signal and a non-constant envelope signal, and a second envelope signal detected from the second signal is the other of the constant envelope signal and the non-constant envelope signal; and     activating a wireless communicator for performing a wireless communication when the wireless communication apparatus detects power of the reception signal and determines that the reception signal is the first signal.

\* \* \* \* \*